US012382969B2

(12) United States Patent
Nebeker et al.

(10) Patent No.: US 12,382,969 B2
(45) Date of Patent: Aug. 12, 2025

(54) FOOD GRADE PRODUCT RECOVERY SYSTEM

(71) Applicant: EvacuPak, Inc., Nampa, ID (US)

(72) Inventors: Travis Nebeker, Middleton, ID (US); Robert Byars, Nampa, ID (US)

(73) Assignee: EvacuPak, Inc., Nampa, ID (US)

( * ) Notice: Subject to any disclaimer, the term of this patent is extended or adjusted under 35 U.S.C. 154(b) by 30 days.

(21) Appl. No.: 18/425,588

(22) Filed: Jan. 29, 2024

(65) Prior Publication Data

US 2024/0251827 A1 Aug. 1, 2024

Related U.S. Application Data

(60) Provisional application No. 63/481,905, filed on Jan. 27, 2023.

(51) Int. Cl.
| | |
|---|---|
| *A23L 5/30* | (2016.01) |
| *A23B 2/00* | (2025.01) |
| *B65B 69/00* | (2006.01) |

(52) U.S. Cl.
CPC .............. *A23B 2/001* (2025.01); *A23L 5/30* (2016.08); *B65B 69/00* (2013.01)

(58) Field of Classification Search
CPC ............ A23B 2/001; A23L 5/30; B65B 69/00
See application file for complete search history.

(56) References Cited

U.S. PATENT DOCUMENTS

| | | | | |
|---|---|---|---|---|
| 2,668,550 | A * | 2/1954 | Burge | B67B 7/28 30/123 |
| 4,961,440 | A * | 10/1990 | Wright | B67B 7/28 222/85 |
| 5,174,828 | A * | 12/1992 | Roth | B67B 7/28 134/16 |
| 6,834,690 | B2 * | 12/2004 | Michaud | B09B 3/00 141/330 |
| 9,216,888 | B2 * | 12/2015 | Eck | B08B 9/093 |
| 9,873,138 | B2 * | 1/2018 | Eck | B30B 1/32 |
| 10,603,699 | B2 * | 3/2020 | Hitchens | B09B 3/00 |
| 11,059,618 | B2 * | 7/2021 | Eck | B65B 69/0041 |

* cited by examiner

*Primary Examiner* — Nicolas A Arnett
(74) *Attorney, Agent, or Firm* — Gravis Law, PPLC; Stephen S. Zimowski

(57) ABSTRACT

A system for automated, hygienic recovery of fluid, food-grade product without it ever contacting the environment outside of its packaging, the system using one or more hygienic lances that pierce the product packaging and features, including in preferable embodiments a distending compression plate to force the product out of the packaging and/or a sanitary pumping system that initiates suction to draw the product out of the packaging, through the one or more hygienic lances, and into a chamber for accumulation, the system being compliant with the hygienic and sanitary standards promulgated by 3-A Sanitary Standards Inc. and adopted by the USDA, the FDA, and state regulatory authorities.

20 Claims, 9 Drawing Sheets

FOOD GRADE PRODUCT RECOVERY SYSTEM

FIELD OF THE INVENTION

The present invention relates to a system and process for recovering food-grade product from product packaging using one or more hygienic lances. More particularly, the present invention provides a system and process for accepting bulk product packaging and efficiently removing and recovering fluid, food-grade product therefrom using a conveyor system that employs one or more hygienic lances to pierce the packaging and a pumping system to remove the fluid product therefrom without contamination.

BACKGROUND OF THE INVENTION

Food waste can become highly problematic in modern economies, both from a logistical and financial perspective. When food products become contaminated, spoiled, or go off-code, more often than not they are simply thrown away. Indeed, federal and state agencies, such as the USDA and FDA, are often involved in ensuring that such food products do not reach the consumer, particularly for those intended for human consumption. And for good reason, as such contaminated, spoiled, or off-code food-grade products can cause harm and spread disease amongst the population.

However, the loss of such food products can create substantial financial and availability disruptions all along the food supply chain. Accordingly, the food industry is always seeking innovation to avoid such losses where possible. These mitigation efforts are often seen in certain agricultural and other related industries, where regulations may be less stringent and the potential risks to the consumers are less severe.

For example, waste recovery systems exist to recover and repurpose animal feed in mass quantities by crushing and/or destroying product packaging to access the food products therein. However, these systems suffer from significant hygienic drawbacks and are therefore inappropriate for recovering food-grade product intended for human consumption, particularly in view of regulatory requirements such as HACAP and the like.

Accordingly, there remains a need in the food industry for systems and processes appropriate for recovery and repurposing of food-grade products for human consumption. Particularly, there remains a need for a system that can hygienically access food-grade product within the product packaging, remove it therefrom, and collect it for re-use or repurposing.

SUMMARY OF THE INVENTION

It is accordingly an object of the present invention to provide such a system and process appropriate for the recovery of food-grade products intended for human consumption hygienically and in a manner in compliance with FDA and other regulations. It is further an object of the present invention to provide such a system that can process large quantities of food-grade product quickly and efficiently and that provides methods for tracking the steps in the processing, monitoring for quality control to ensure compliance with regulatory standards, and demonstrating that compliance through consistent, repeatable performance.

To accomplish these and other objectives, the present invention provides a system for automated, hygienic recovery of fluid, food-grade product. The system provides a process for recovering such product without it ever contacting the environment outside of its packaging. The system uses one or more hygienic lances that pierce the product packaging. A sanitary pumping system then initiates suction to draw the product out of the packaging, through the one or more hygienic lances, and into a chamber for accumulation. The chamber is preferably a plenum or the like compliant with the hygienic and sanitary standards promulgated by 3-A Sanitary Standards Inc. and adopted by the USDA, the FDA, and state regulatory authorities.

The recovered food-grade product is then pumped from the chamber using a second sanitary pumping system compliant with 3-A hygienic and sanitary standards, preferably using a liquid ring pump, through a 3-A compliant angle line filter, and past a 3-A compliant one-way check valve, preventing any backflow in the system that could jeopardize the compliance with 3-A sanitation standards. Preferably, all process connections throughout the system are sanitary tri-clamp connections, helping to ensure compliance with 3-A sanitation standards. Subsequent to filtration, the food-grade product is withdrawn from the system and reprocessed for human consumption or use as an ingredient in product intended for human consumption.

The system is primarily intended for use on low viscosity food-grade products, such as sanitary beverages, stocks, thin soups, dairy products, boxed wines, and the like. The system is preferably capable of handling products with higher viscosity levels as well, such as peanut butter and the like. The system is operable on products packaged within any polymer or paperboard packaging and the like. The system is preferably operable to recover product directly from primary packaging, such as cartons or bottles containing the product directly, or from secondary packaging, such as corrugated packaging containing numerous primary packages in known arrangement. The system's hygienic lances are preferably configurable in multiple arrangements so as to allow positioning to facilitate recovery from various arrangements of packaged product.

Preferable embodiments of the system include an intake system with, for example, an infeed conveyor belt feeding items to be processed into a pre-processing station. Preferably, the pre-processing station includes a flat, slip-top surface and can accommodate four or more cases of product to be processed. The pre-processing station preferably includes means for scanning and indexing the various cases of product for processing and isolating one at a time for transitioning to the evacuation station. The pre-processing station may also include means for scanning the contents of packaging, for example using infrared three-dimensional imaging or other, similar techniques, so as to automatically position the product to allow one or more hygienic lances to align with the recoverable product. In some preferable embodiments, the one or more hygienic lances are subjected to manual repositioning alternatively to or in addition to the automatic positioning process. In some preferable embodiments, the scanning and positioning processes occur once the single case of product for processing has been isolated at the evacuation station.

The system thus starts by isolating a single case or grouping of cases of product among those present at the pre-processing station, positioning that product at the evacuation station, and positioning the one or more hygienic lances for processing. Whether the positioning of product and hygienic lances occurs automatically or manually, the product is now ready for extraction.

To accomplish this primary extraction objective, the evacuation station preferably includes a distending compression plate preferably oriented above the product for processing. Upon activation, the distending compression plate applies pressure, preferably from above, to the top of the case of product. This helps to ensure the case of product does not shift or re-orient in any way when the one or more hygienic lances extend into and puncture the product for extraction, preferably from below.

It should be noted that, while preferable embodiments employ the distending compression plate above the product and the one or more hygienic lances below, any alteration of this locational arrangement is possible without straying from the principles of the present invention, as those of skill in the art will recognize. For example, the one or more hygienic lances could extend from above or from a side while the distending compression plate applies pressure from below or from the opposite side, respectively.

As noted, the system preferably includes technology capable of scanning a product for processing's packaging to determine the arrangement and orientation of the contents to maximize the efficiency of the extraction process. For example, products with multiple containers arranged within a single packaging case are preferably detected so as to allow for positioning of the one or more hygienic lances to extract product from several, and preferably all, of the internal containers simultaneously. Likewise, for large amounts of recoverable product within a single large container, several hygienic lances are preferably arranged to effectively penetrate the container simultaneously and increase the speed and efficiency of extraction. Those of skill in the art will recognize the flexibility provided by the use of numerous, repositionable hygienic lances in accordance with the teachings of the present invention.

This scanning technology may also record product type, date of production, or other pertinent information. Recorded information is made available for supervisory control of both what has been recovered by the system and/or what is allowed to be recovered by the system. The system may pause or reject products not within the predetermined products elected by the operators or system designers.

Once the one or more hygienic lances extend into the product packaging and reach a recovery depth of penetration, as determined preferably by system settings manually provided or automatically detected, the system preferably employs a pump connected to the one or more hygienic lances to extract the product. The one or more hygienic lances thus preferably include a sharpened and/or pointed penetration end adjacent to the product for processing and an extraction end located at the opposite end of the hygienic lance. The one or more lances are preferably comprised of a hard metal or plastic material formed into a cylindrical shape, although other shapes may be used in some preferable embodiments. The one or more lances preferably include an aperture located near the penetration end and a hollow interior connected thereto such that the suction created by the pump, preferably connected to the extraction end of the one or more hygienic lances, draws the product for recovery out of the packaging, into and through the one or more hygienic lances, and into the recovery chamber.

In some preferable embodiments, tubing compliant with 3-A sanitation standards may be used to transfer the extracted product from the extraction end of the one or more hygienic lances to the recovery chamber. In preferable embodiments, the distending compression plate will also operate to extend toward the product for processing's packaging during the extraction process, which may cause, in preferable embodiments, a portion of the packaging to compress/collapse, helping to encourage extraction of the recoverable product held within.

For applications to products of relatively low viscosity in which the system deploys the distending compression plate from above and the one or more hygienic lances from below, the product may be effectively extracted without use of the pumping mechanism connected to the extraction end of the one or more hygienic lances. This of skill in the art will recognize the various manners of applying the present invention to most effectively extract the maximum amount of recoverable product in the most efficient manner during processing.

In preferable embodiments of the present invention employing the pumping mechanism during extraction, the pump will generally run until the extraction process is complete. The system preferably employs a sanitary pressure sensor which monitors the discharge pressure in the pumping system and, when the pressure reaches a predetermined range, the pump will automatically shut off. In some preferable embodiments, the pump may remain in operation and be bypassed to allow greater efficiency and reduce wear. In some preferable embodiments, the determination of when to activate and deactivate the pumping mechanism may also or alternatively be made manually using a timer, switch, button, or the like.

Preferably embodiments of the present invention also employ a sanitary flow switch to monitor the flow of product through the system and into the recovery chamber. Preferable embodiments of the system also employ a sanitary air eliminator to prevent any air taken in during the extraction process from entering the product stream, helping to ensure compliance with 3-A sanitation standards throughout the system and for the duration of the extraction and recovery processes.

Upon completion of the extraction process, the pumping mechanism will cease or bypass pumping and the distending compression plate will retract away from the product packaging, as will the one or more hygienic lances. Once the system has fully disengaged from the empty product packaging, it may be removed manually or through an additional conveyor system that delivers it to a waste site. In some preferable embodiments, the waste material may instead be transferred to a compacting station, where it is compacted and baled for transfer to a waste location or, in some instances, for repurposing or reuse.

As noted, the recovery chamber preferably comprises a plenum or the like compliant with 3-A sanitary standards. The recovery chamber preferably includes an isolation valve and a vapor lock that, working in conjunction, prevent any drainage of extracted product outside of the recovery chamber onto the system work surface or elsewhere. The isolation valve and a vapor lock also operate to ensure no external air is introduced to the extracted product during processing, in compliance with 3-A sanitation standards.

In some preferable embodiments, further sterilization is provided using ultra-violate light on: the one or more hygienic lances, preferably prior to insertion into the product packaging; the piercing zone(s) of the product packaging, such as the entire side where the hygienic lances will enter or the specific locations where the hygienic lances will enter, also preferably prior to insertion of the hygienic lances into the product packaging; and/or the recovered product after extraction and while in or on its way into the recovery chamber. Those of skill in the art will recognize the manners and advantages of using UV light sterilization in the present invention.

The present invention preferably includes a control system operable to input system settings and monitor and manage the extraction process. The operator of the control system interacts through known means, preferably using a touchscreen or other interactive display. The operator can input criteria such as packaging dimensions, arrangement of the product within the packaging, and the like. The control system can use this information to arrange the one or more hygienic lances to align with the product prior to initiation of the extraction process. As noted, some preferable embodiments include scanning features capable of automating this function while the product packaging is located at the pre-processing station or once is have been moved to the evacuation station.

The operator of the control system can also entire product information, such as identity, lot number for tracking purposes, etc. where desired and/or necessary to comply with food-grade product regulations, such as hazard analysis and critical control points (HACCP) and the like. Upon the operator's initiation of the system through the control system, preferable embodiments of the system perform a safety check to ensure all features are in working order, sanitized pursuant to 3-A standards, and free of obstructions. Once the safety protocol has been completed, the system enters into production mode, whereby the conveyor system activates to transport product-for-processing from the pre-processing station to the evacuation station and, later, from the evacuation station to the compacting station or other waste handling location.

Also upon entry into production mode, the system activates the evacuation system operating at the evacuation station, including the distending compression plate, the evacuation chamber and pumping system, and all features of the same. The one or more hygienic lances are also moved into place to maximize the extraction efficiency of the extraction process. As the user loads product into the system, preferably using a short-side-leading vertical orientation in most instances, the product is conveyed from the pre-processing station to the evacuation station. As product enters the evacuation station, it is prepared for processing, including any scanning, orientation, and other processes performed by preferable embodiments of the system.

In some preferable embodiments, safety systems such as light curtains, door sensors, safety door locks, pneumatic energy relief systems, presence sensors, and safety I/O prevent unintentional entrance of humans, human extremities, or foreign objects of a predetermined size range into the evacuation chamber during operation. In some embodiments, light curtains, safety scanners, or other safety devices may be used to allow product to enter the chamber while protecting against foreign body entrance.

Only one unit or unit group of product packaging (e.g. case of product) may enter the evacuation station at a time. Additional units are preferably held at the pre-processing station or at a staging area before entering the evacuation station. Upon arranging the product for extraction, the evacuation system engages, the distending compression plate extends to contact a side of the product packaging—preferably the top—and the one or more hygienic lances extend into the opposite side of the product packaging—preferably the bottom—and into any internal container(s) holding the recoverable product. Once the one or more hygienic lances reach the appropriate depth, as determined through the system's scanning features or as provided by the operator of the control system, the pumping system's isolation valve opens releasing the pumping pressure to begin extraction of the recoverable product. In some embodiments, the pump bypass will disengage for forward flow of recovered product to destination.

The distending compression plate, which operates to avoid displacement as the one or more hygienic lances penetrate the product packaging, continues to apply pressure to and compact the product packaging throughout the extraction process, assisting the pumping system in maximizing product recovery. The pumping system continues to run applying downstream pressure until its sensors and/or flow switch detect stagnation, which indicates complete extraction. Pumping may continue during extraction to maximize percentage recovery.

Once extraction is completed, the evacuation system's isolation valve closes and the pumping systems ceases operation. In some embodiments, the isolation valve will bypass, thereby allowing the pump to continue running for a predetermined time interval or continuously until the next recovery unit begins. The one or more hygienic lances are retracted from the product packaging, as is the distending compression plate, and the empty product packaging is discharged from the evacuation station and transported to the compacting station or other waste handling location. At this point, the next unit of product may enter the evacuation station, and the process is repeated until the system determines no further units of product for processing are present or the operator of the control system shuts down operation, taking the system out of operation mode.

Upon completion of operation mode, preferable embodiments of the system employ a sanitary air-blow process to transmit the recovered product from the evacuation chamber into a destination tank, wherefrom it can be transported by the customer or operator of the system for reuse, repurposing, etc. Preferable embodiments of the present invention also employ clean-in-place (CIP) sanitization system and process to thoroughly clean all parts and features of the evacuation system to ensure compliance with 3-A sanitation standards.

In preferable embodiments, the CIP process includes placing a cleaning pan and gasket over the plenum or similar recovery chamber. This may be accomplished manually or through an automated process using a supervisory system, in some preferable embodiments. The CIP process also includes, in some preferable embodiments, connecting the CIP system to a customer-supplied CIP header using a tri-clamp or the like. Once the CIP system has been engaged, the operator of the control system and, in some preferable embodiments, the supervisory system, can initiate CIP mode, in which the pumping system is activated, the evacuation system is flushed and sanitized, and the CIP process employs perioding valve pulsing of the pumping system, preferably using a cam timer. The supervisory system preferably employs sensors or other means of determining when the system has been fully sanitized to 3-A standard specifications, and the CIP process is then terminated manually by the operator or through a digital signal.

Upon completion of the CIP process, the present invention is ready to process the next batch of recoverable, food-grade product. Some preferable embodiments of the present invention are designed for easy assembly and disassembly, allowing the system to be transported to another location for further use or stored while not in use.

As those skilled in the art will appreciate, the present invention is not limited to the embodiments and arrangements described above. Other objects of the present invention and its particular features and advantages will become more apparent from consideration of the following drawings and detailed description of the invention.

DETAILED DESCRIPTION OF THE INVENTION

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

Figure 1:
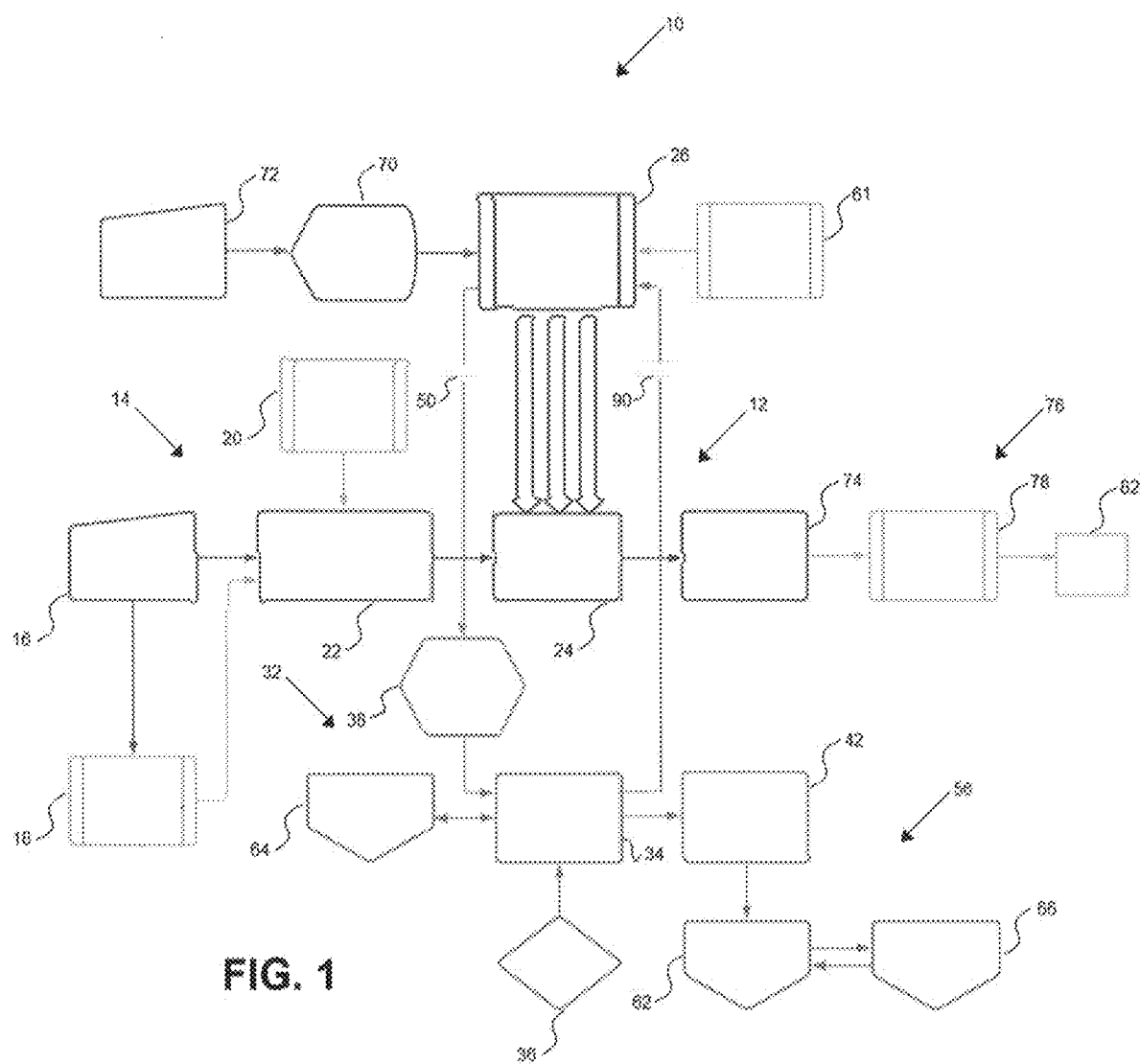
FIG. 1 depicts a schematic representation of the recovery system according to preferable embodiments of the present invention.

Referring first to the schematic depiction of the present invention in FIG. 1, included are several aspects of preferable embodiments of the Sanitary Product Recovery (SPR) system 10. As depicted, the SPR system 10 includes a product flow system 12 transporting the food-grade product for recovery among various staging stations for processing. The staging stations include the pre-processing station 14, which includes in preferable embodiments the loading station 16, an optional de-palletizing process 18, which may be automated or manual in some embodiments, an optional UV sterilization process 20, and scanning systems including sensors, imaging technology, and the like (not depicted) in some preferable embodiments for determining the size, orientation, and arrangement of recoverable product within the packaging. The pre-processing/product-staging station 14 also employs the infeed conveyor 22 for transporting the product for recovery into the evacuation station 24. Some preferable embodiments may also include corrugated case removal systems.

The evacuation station 24 preferably includes, as depicted, the distending head/extruding features 26, including the distending compression plate 28 and the one or more hygienic lances 30. As depicted, the hygienic lances 30 are connected to the fluid flow system 32, which includes the pumping system 80 with product evacuation pump 34, preferably using a liquid ring hygienic 3-A pump, and one or more sanitary pressure sensors 36, which monitor the discharge pressure in the pumping system 80.

The fluid flow system 32 also preferably employs a one-way isolation valve 38 compliant with 3-A sanitation standards, which prevents back flow of product within the fluid flow system 32, a two-way bypass valve 40 compliant with 3-A sanitation standards, which allows recirculation and/or forward flow, a sanitary filtration system 42, preferably using a hygienic angle line 3-A filter, and a 3-A sanitary flow switch 44 to monitor the flow of product 50 through the fluid flow system 32 and into the recovery chamber 46. Preferable embodiments of the fluid flow system 32 also employ a sanitary air eliminator 48 to prevent any air taken in during the extraction process from entering the product 50 stream, helping to ensure compliance with 3-A sanitation standards throughout the SPR system 10 and for the duration of the extraction and recovery processes.

The evacuation station 24 also preferably includes means for holding the product for recovery 50 in place during the evacuation process, which means may include the distending head/extruding features 26 depicted, other features extruding from the product stationing surface 29 for holding the packaging in place, and other features and techniques that will be known to those of skill in the art.

Once the fluid 90 reaches the evacuation chamber 46, it can be recovered directly for reuse or repurposing or can be transferred to a destination tank 52 or other removable containers for reuse or repurposing off-site by the operator. Some preferable embodiments of the SPR system 10 initiate a sanitary air blow purge to transfer the recovered product 50 from the evacuation chamber 46 to the destination tank 52 or other removeable containers.

Once the recovered product 50 has been removed from its packaging at the evacuation station 24, waste product is removed from the SPR system 10 through transport along the outfeed conveyor 74 and sent to the waste processing system 76. The waste processing system 76 includes, in some preferable embodiments, an optional waste compactor 78, after which it is preferably transferred to a waste removal station 82 for removal by the user and further processing or disposal off-site.

As depicted in FIG. 1, preferable embodiments of the SPR system 10 also include a clean-in-place (CIP) system 56 for sanitizing the SPR system 10 once a batch of product 50 for recovery has been fully processed. The CIP system 56 primarily operates to sanitize the fluid flow system 32, as depicted, but also preferably includes features to clean the product flow system 12, in particular the one or more hygienic lances 30. The CIP system 56 may be provided externally by others or included in the preferable embodiments.

The CIP system 56 preferably includes placing a cleaning hood 58 and gasket 60 over the features of the evacuation station 24, including the one or more hygienic lances 30, either manually or using a CIP supervisory system operating an automated process. The CIP system 56 may also apply UV sanitation 61 to the distending head/extruding features 26, including the distending compression plate 28 and the one or more hygienic lances 30, in some preferable embodiments. The CIP system 56 also preferably includes a CIP processing connection 62 and CIP supply 64 and return 66 connections connected to the fluid flow system 32, which are used to introduce and remove, respectively, the cleaning product used to sanitize the SPR system 10. Once the CIP system 56 has been engaged, the operator of the CIP supervisory system, which is preferably a feature of the SPR system's broader control system 70, can initiate CIP mode, in which the pumping system 80 is activated, the fluid flow system 32 is flushed and sanitized, and the CIP supervisory system employs perioding valve pulsing of the pumping system 80, preferably using a cam timer. The CIP system 56 also preferably employs sensors or other means of informing the CIP supervisory system when the SPR system 10 has been fully sanitized to 3-A standard specifications, and the CIP process is then terminated manually by the operator or through a digital signal.

As depicted in FIG. 1, the operator of the SPR system 10 primarily interacts through the control system 70, which preferably includes a touchscreen, either onboard or remote, or other like display and input system 72, as will be known to those of skill in the art. The operator can use the control system 70 to provide information to the SPR system 10 to assist with the extraction and recovery processes. For example, the operator may provide the SPR system 10 with information regarding the size, orientation, and arrangement of recoverable product 50 and its packaging. This is particularly necessary for embodiments of the SPR system 10 that do not employ sensors, imaging technologies, and the like—whether at the pre-processing station 14 or the evacuation station 24—for guiding the placement, depth of penetration, etc. for the hygienic lances 30.

Likewise, the operator can instruct the SPR system 10 on the placement and depth of penetration for the hygienic lances 30, can set the pressure level below which the pumping system 80 stops running, how recovered product 50 and waste materials are handled post-extraction, etc. Those of skill in the art will recognize various other functions and features of the present invention that will benefit from operator inputs through the control system 70, all of which are included in the scope of the present invention.

Figure 2:
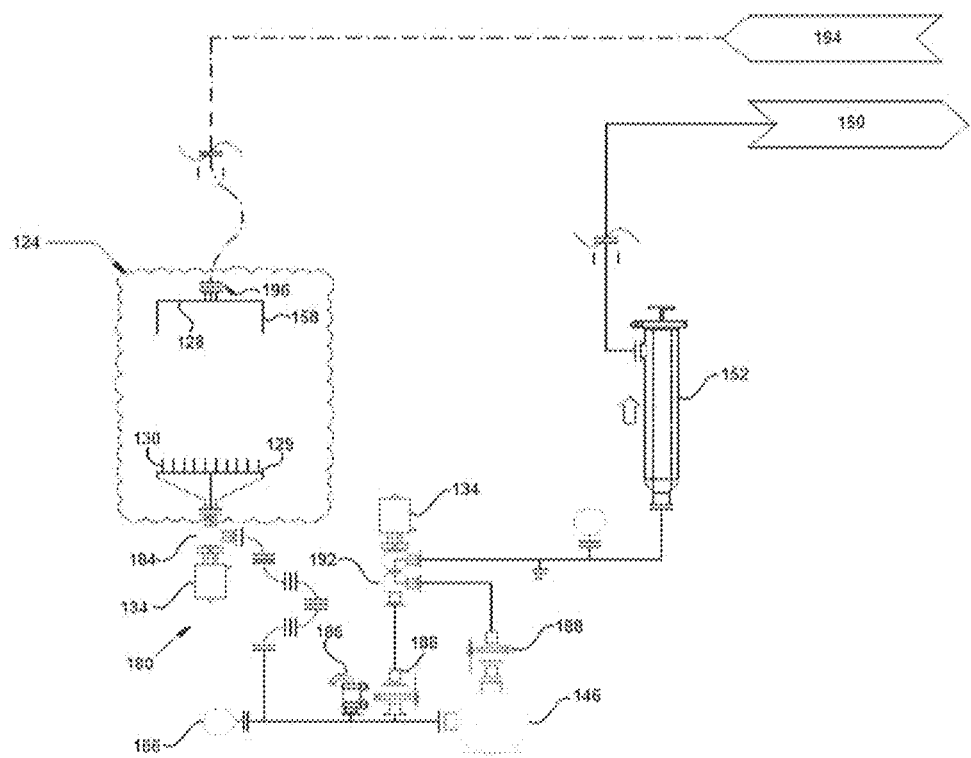
FIG. 2 depicts a schematic representation of the recovery system according to the preferable embodiments of the present invention depicted in FIG. 1.
Figure 3A:
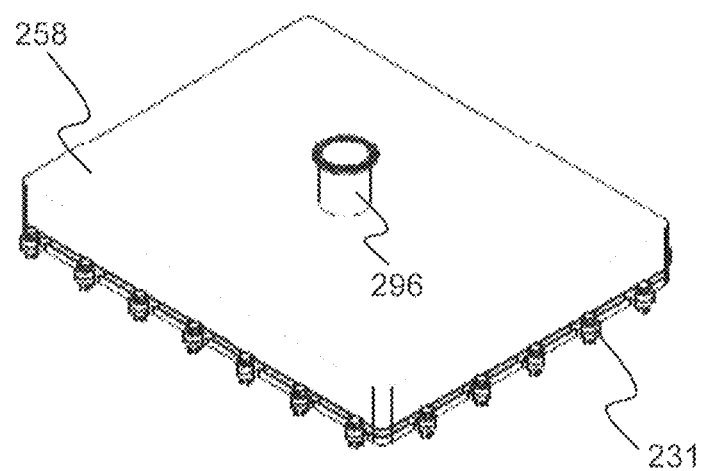
FIG. 3A depicts an elevation view of certain preferable features of the recovery system according to the preferable embodiments of the present invention depicted in FIGS. 1-2.
Figure 3B:
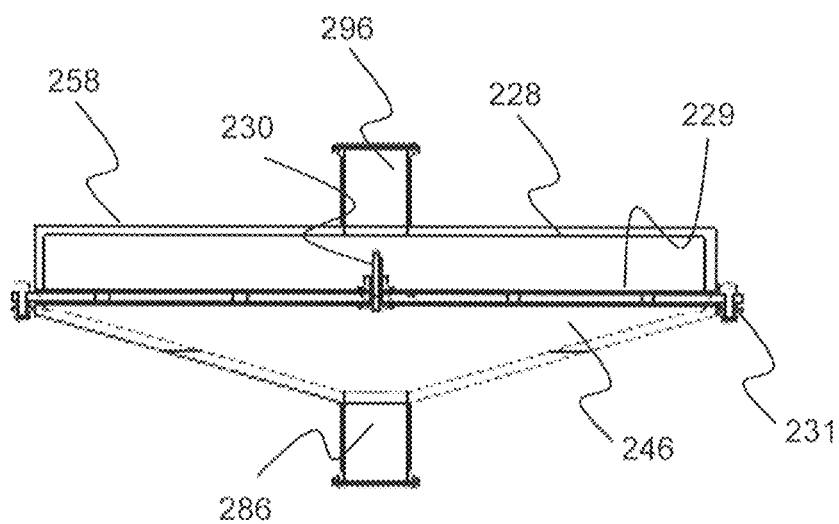
FIG. 3B depicts an orthogonal view from the front of certain preferable features of the recovery system according to the preferable embodiments of the present invention depicted in FIGS. 1-2 and 3A.
Figure 3C:
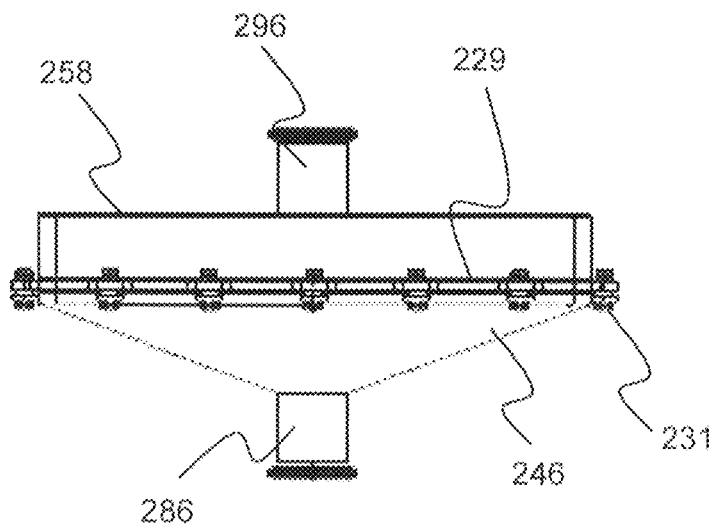
FIG. 3C depicts an orthogonal view from the side of certain preferable features of the recovery system according to the preferable embodiments of the present invention depicted in FIGS. 1-2 and 3A-B.
Figure 3D:
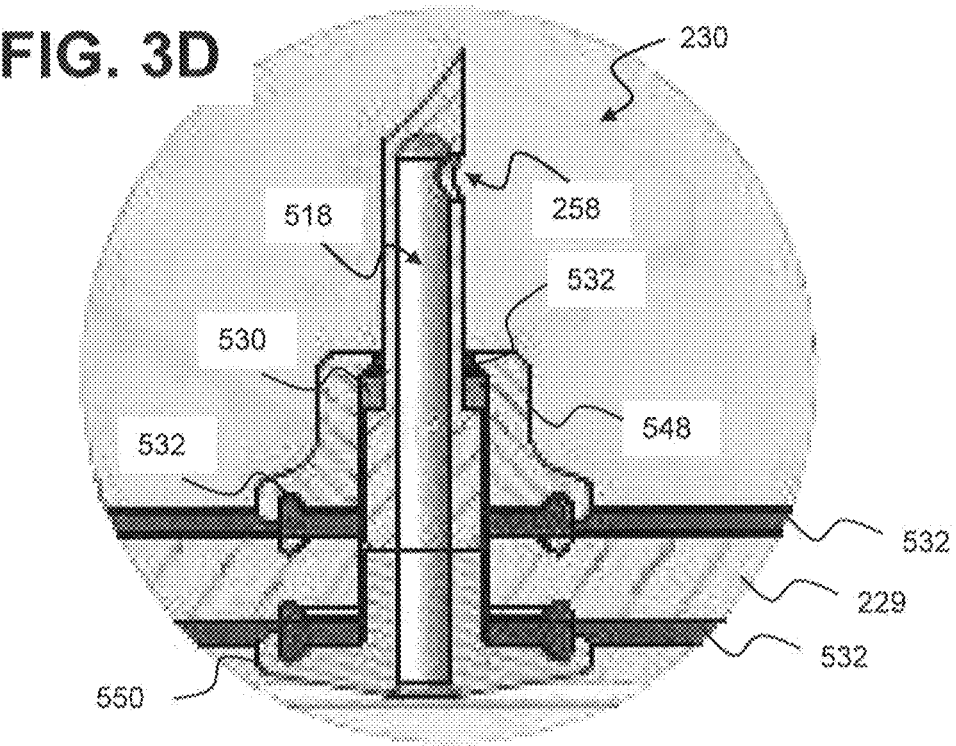
FIG. 3D depicts a cross-sectional view from the side of a hygienic lance according to the preferable embodiments of the present invention depicted in FIGS. 1-2 and 3A-C.
Figure 3E:
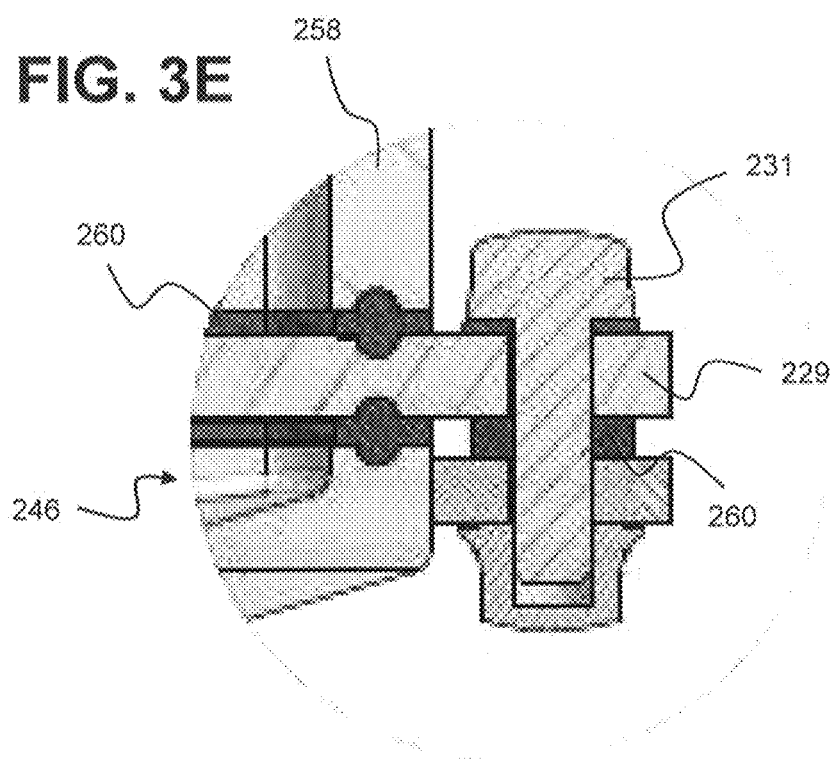
FIG. 3E depicts a cross-sectional view from the side of certain preferable connection features of the recovery system according to the preferable embodiments of the present invention depicted in FIGS. 1-2 and 3A-D.
Figure 4A:
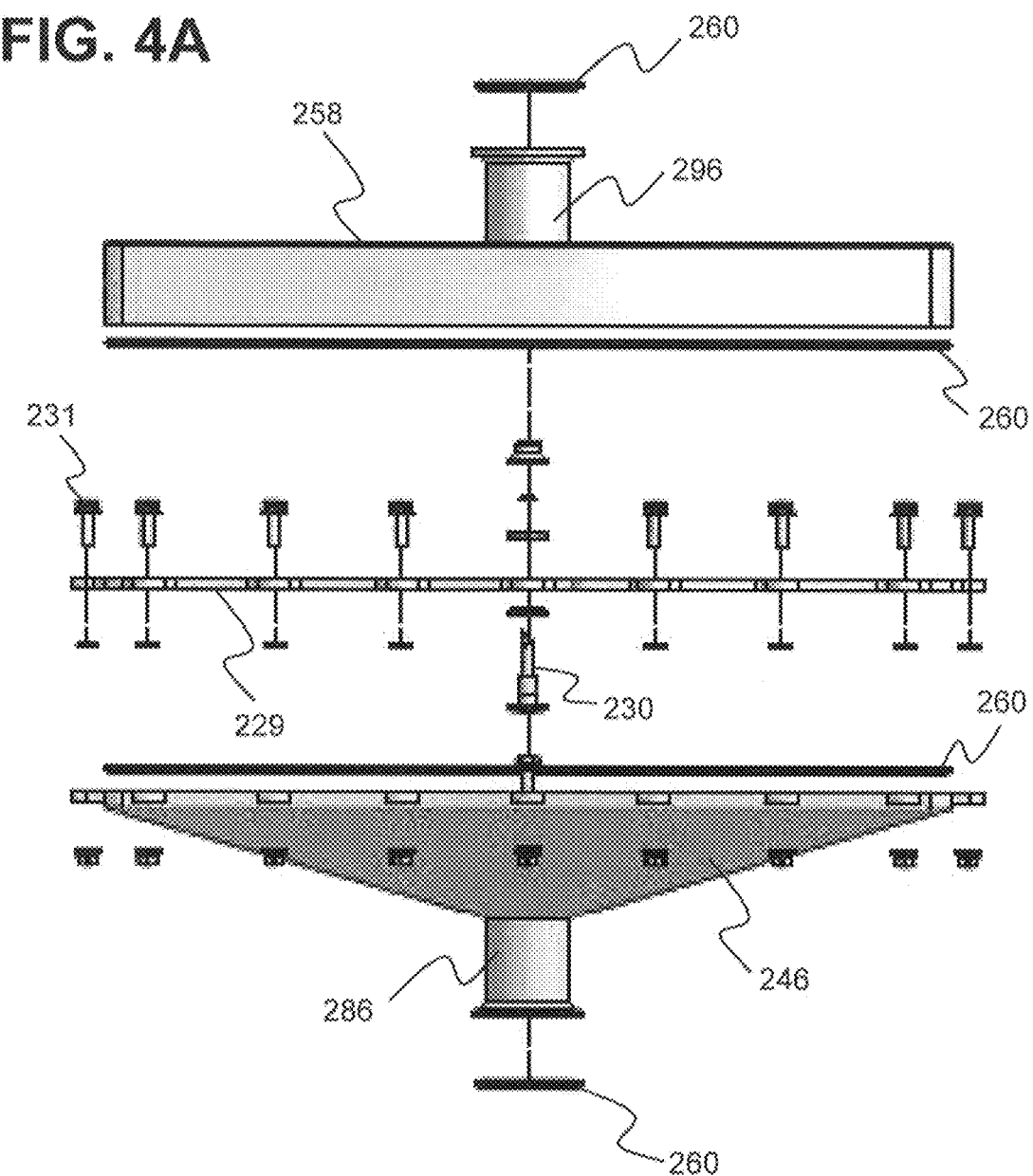
FIG. 4A depicts an assembly view from the front of certain preferable features of the recovery system according to the preferable embodiments of the present invention depicted in FIGS. 1-3.
Figure 4B:
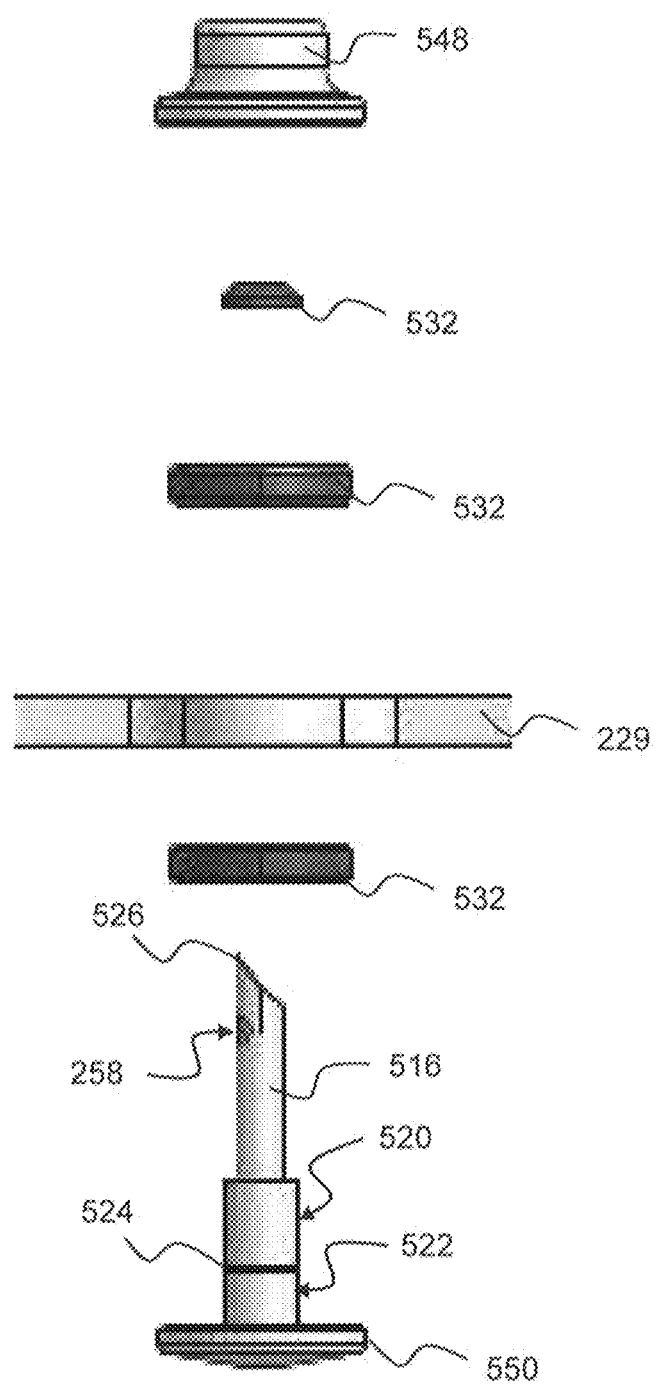
FIG. 4B depicts an assembly view from the side of a hygienic lance according to the preferable embodiments of the present invention depicted in FIGS. 1-3 and 4A.
Figure 4C:
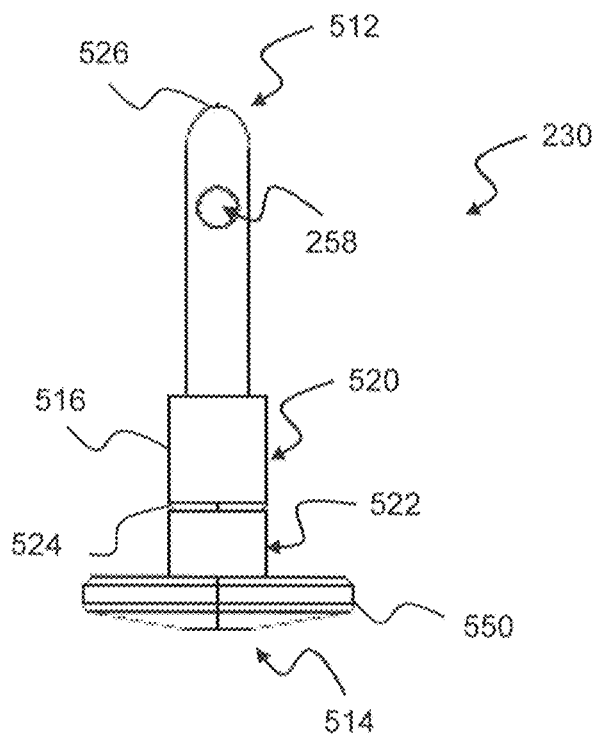
FIG. 4C depicts an orthogonal view from the front of a hygienic lance according to the preferable embodiments of the present invention depicted in FIGS. 1-3 and 4A-B.
Figure 4D:
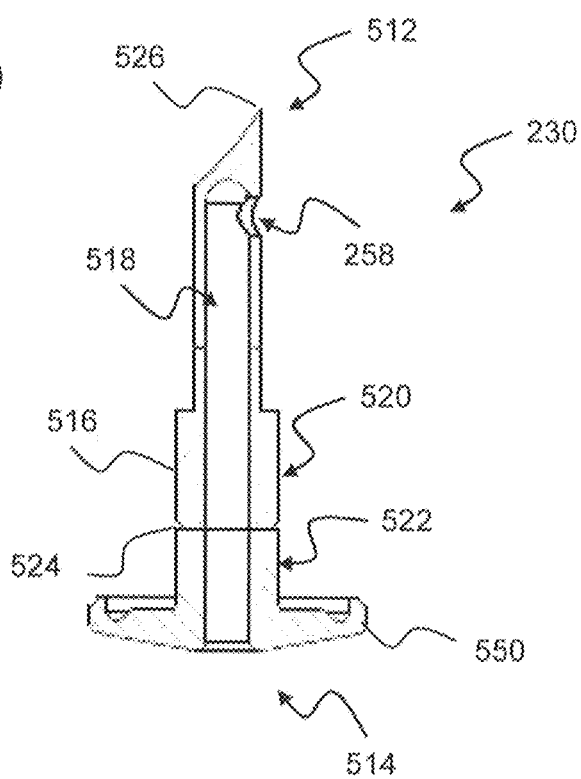
FIG. 4D depicts a cross-sectional view from the side of a hygienic lance according to the preferable embodiments of the present invention depicted in FIGS. 1-3 and 4A-C.
Figure 5A:
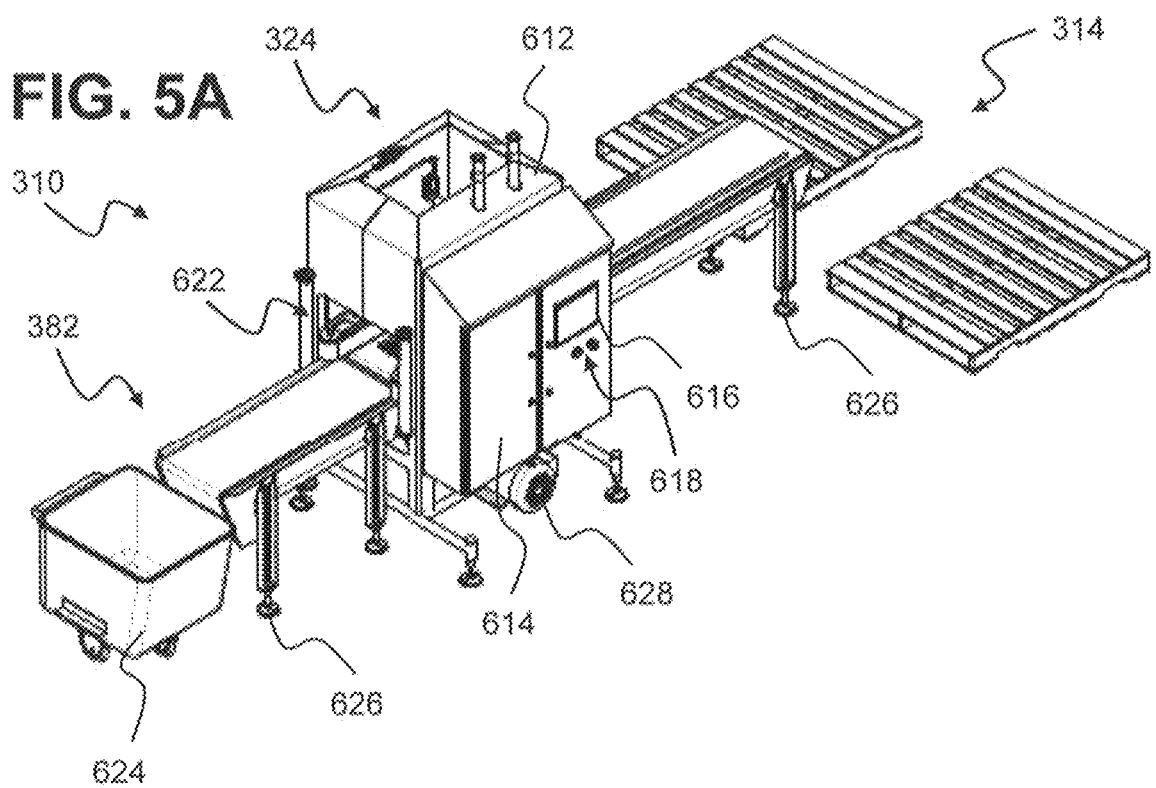
FIG. 5A depicts an elevation view of the recovery system according to the preferable embodiments of the present invention depicted in FIGS. 1-4.
Figure 5B:
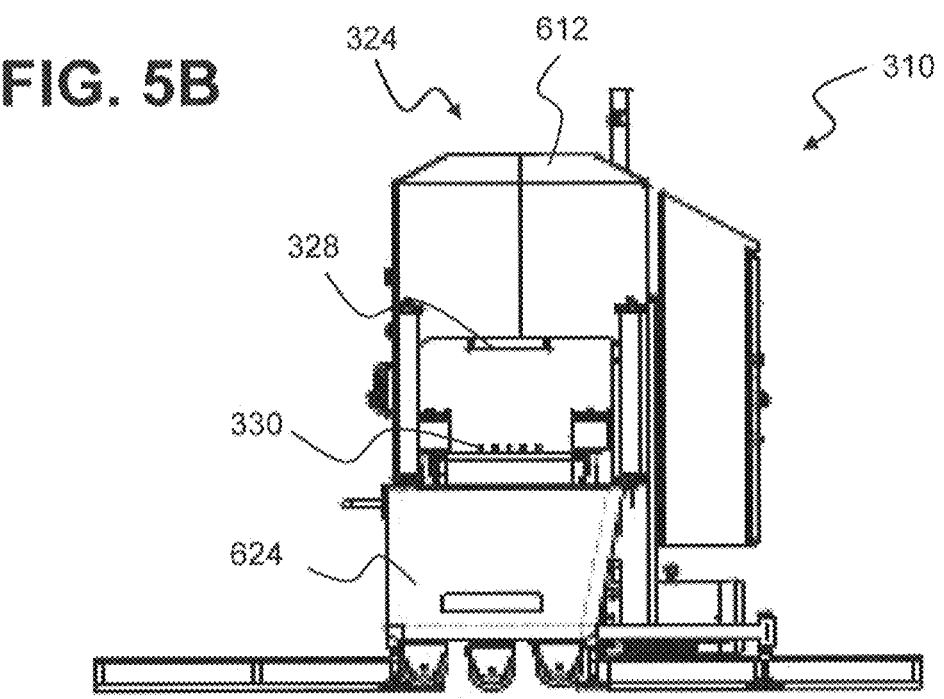
FIG. 5B depicts an orthogonal view from the side of the recovery system according to the preferable embodiments of the present invention depicted in FIGS. 1-4 and 5A.
Figure 5C:
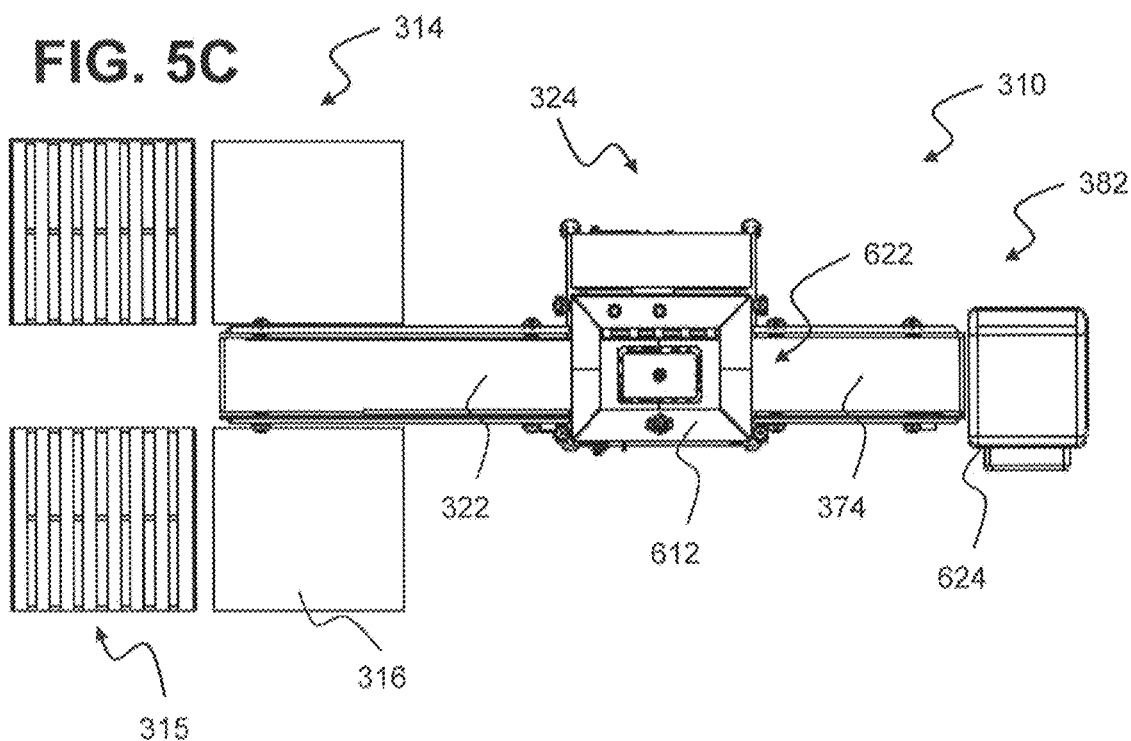
FIG. 5C depicts an orthogonal view from above of the recovery system according to the preferable embodiments of the present invention depicted in FIGS. 1-4 and 5A-B.
Figure 5D:
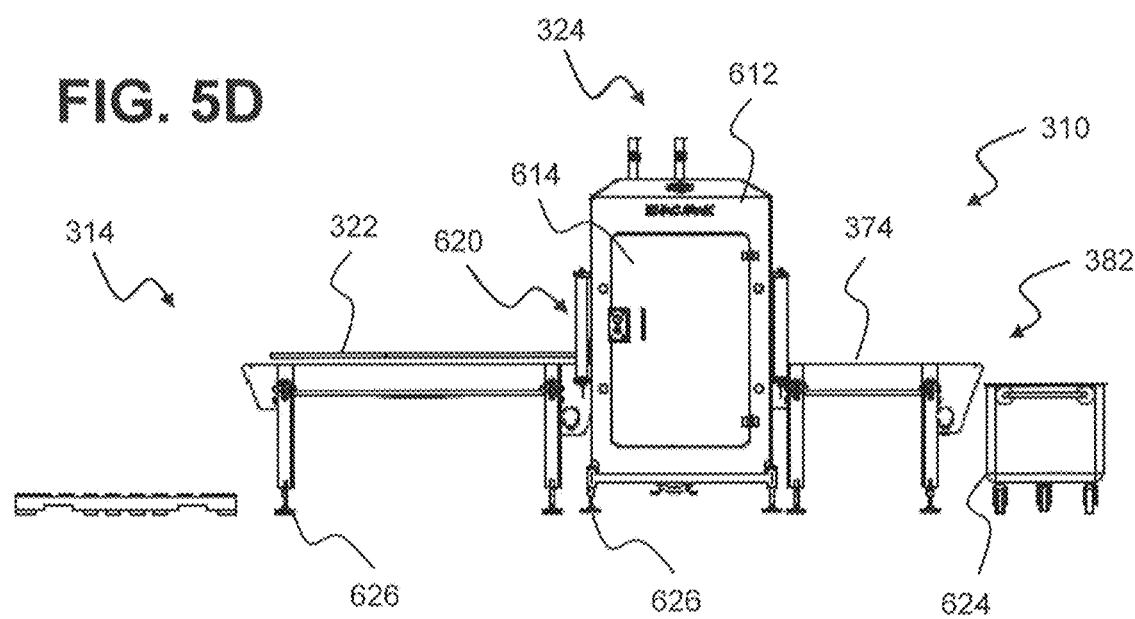
FIG. 5D depicts an orthogonal view from the back of the recovery system according to the preferable embodiments of the present invention depicted in FIGS. 1-4 and 5A-C.

Referring next to FIG. 2, a schematic depiction of the features of the SPR system 110 is presented. The evacuation station 124 is depicted with the distending compression plate 128 and the hygienic lances 130 protruding up from the product stationing surface 129 for insertion into the packaging of the food-grade product 150 for recovery. The evacuation station's 124 evacuation chamber 146 is also depicted, with a connection end connected to the pumping system 180 comprising a pump 134 and a valve 184 and transportation features 186 for carrying the extracted product 150 into a destination tank 152. As depicted, the transportation features 186 preferably include a hygienic angle line 3-A compliant filter 188 and one or more valves 192 preferably including a one-way 3-A check valve 192 for backflow prevention, such as the depicted Dixon Sanitary 3-A Swivel.

Upon reaching the destination tank 152 or other removable containers, the recovered product 150 is discharged and transported off-site for reuse or repurposing. Ultra-violate light or other sanitation features may be applied throughout the SPR system 110 to sanitize the recovered product 150 as it transitions between stations, evacuation chamber 146, and destination tank 152 or other removeable containers. Once the recovered food-grade product 150 has been fully removed from the SPR system 110, the CIP process is engaged to clean and sanitize the system for subsequent use. Such subsequent uses may be recovery of different food-grade product 150, and whatever the case 3-A sanitation standards require that the SPR system 110 be thoroughly cleaned and sanitized between uses.

As depicted in FIG. 2, preferable embodiments of the CIP system 156 include a cleaning hood 158 that is placed over the top of the hygienic lances 130 and the product stationing surface 129 at the evacuation station 124. The cleaning hood 158 preferably includes a cleaning mixture intake portion 196 that is connected to an intake feed for the cleaning mixture 194, as depicted. The cleaning mixture 194 is thus fed into the SPR system 110 through the cleaning hood 158, is pumped through the SPR system 110 using the pumping system 180 and operates to thoroughly clean and sanitize all features of the SPR system 110. Once the CIP process is complete, the cleaning mixture 194 is discharged from the SPR system 110 much in the same way as recovered product 150 is discharged after extraction. The CIP cleaning mixture 194 thus enters the SPR system 110 at the evacuation station 124 through the hygienic lances 130 and travels into the evacuation chamber 146, through the transportation features 186 and into the destination tank 152, if any, before being expelled from the SPR system 110 entirely, in preferable embodiments. This operates in a recirculating fashion as would be known by those of skill in the art.

Referring now to FIGS. 3 and 4, depicted are preferable embodiments of features of the SPR system 210, including the CIP system's cleaning hood 258, which may also serve as the evacuation station's 224 distending compression plate 228 in some preferable embodiments, and the evacuation station's 224 hygienic lances 230, product stationing surface 229, and evacuation chamber 246, a plenum in the preferable embodiments depicted in FIGS. 3-4. Each of these features is preferably comprised of stainless steel, and of wetted materials constructed of type 304 or 316 stainless steel in preferable embodiments, as will be understood by those of skill in the art. All wetted surfaces, including the product stationing surface 229 and the hygienic lances 230, are preferably finished to a minimum surface roughness of no. 4 standard satin finish (32 Ra).

As shown, the cleaning hood 258 is sized and shaped to fit on and to the product stationing surface 229, encompassing the hygienic lances 230 and matching the size of the evacuation chamber 246, in preferable embodiments. The cleaning hood 258 also preferably includes the cleaning mixture intake portion 296 through which the cleaning mixture 294 is introduced to the SPR system 210 during the CIP process, with a preferable minimum fluid velocity of 5 feet per second consistently throughout the CIP process. The CIP cleaning hood 258 may not be in place, in some embodiments, during the extraction process and may be added when the extraction process has been completed for a batch of food-grade product 250 recovery and the SPR system 210 transitions to the CIP process.

As shown particularly in the disassembly depiction of FIG. 4, the product stationing surface 229 is attached to the evacuation chamber 246, preferably using bolts 231 or other means known to those of skill in the art. One or more apertures in the product stationing surface 229 align with the one or more hygienic lances 230, allowing the hygienic lances 230 to retract below the product stationing surface 229 and extend upward through the product stationing surface 229 and into the product packaging to penetrate and extract the recoverable product 250 during the extraction process.

Gaskets 260 are included between the CIP system's 256 cleaning hood 258 and the product stationing surface 229 and between the product stationing surface 229 and the evacuation chamber 246, as depicted in FIGS. 3-4. The gaskets 260 create an airtight seal between the features to ensure compliance with 3-A sanitation standards during the extraction process and the CIP process. The SPR system 210 preferably uses standardized 3-A tri-clamp gaskets 260 position-able using small cut-out portions running along the circumferences of the respective parts. All gaskets 260 used by the SPR system 210 are preferably comprised of Ethylene Propylene Diene Monomer (EPDM), Buna, or Teflon material.

The numerous gaskets 260 and seals employed by the SPR system 210 ensure that food product 250 does not flow and/or accumulate into any crevices, contact points, dead legs, etc. found within the system. All such potential sanitation breaches are sealed using gaskets 260 and the like, rendering all surfaces and contact points that recovered product 250 may contact during the extraction process smooth and finished to avoid product accumulation. There are no exposed threads or exposed sealing surfaces in product contact zones throughout the SPR system 210. All gaskets 260 in product zones have standardized 3-A tri-clamp profiles, and all gaskets 260 outside product zones are sanitary in construction for operation involving food-grade product 250.

Referring specifically to the hygienic lance 230 depicted in FIGS. 3-4, the hygienic lance 230 includes a penetration end 512 adjacent to packaged-product-for-recovery 250 and an extraction end 514 adjacent to the evacuation chamber 246 and/or transportation features 286. In preferable embodiments, as depicted, a housing 516 surrounds an extraction tube 518, each extending the length of the hygienic lance 230 from penetration end 512 to extraction end 514. The housing 516 may be formed of a single, continuous feature or may include an upper housing portion 520 and a lower housing portion 522 connected using a sanitary weld 524. Regardless, the housing 516 at the penetration end 512 of the hygienic lance 230 is sharpened and formed into a point 526 for effective insertion into the packaging of the food-grade product 250 for recovery. As depicted, the housing 516 also includes one or more apertures 528 near the penetration end 512, the one or more apertures 528 being in fluid communication with the internal extraction tube 518 facilitating the removal of recovered product 250 through the hygienic lances 230.

As shown particularly in FIG. 3, the hygienic lance 230 is preferably removably attached to the product stationing surface 229. Such arrangement allows for repositioning and rearranging the orientation of the one or more hygienic lances 230 at the evacuation station 224 to maximize the efficiency of the extraction process. This repositioning and rearranging procedure may be done manually or, in some preferable embodiments, occur automatically based on data about the product-for-recovery 250 and its packaging, which data may in turn be entered manually by the operator of the SPR system's control system 270 or may be observed by the SPR system 210 automatically through the use of scanners, sensors, imaging technology, and the like.

Like the other connection points in the SPR system 110, including the connection between the CIP cleaning hood 258 and the product stationing surface 229 and between the product stationing surface 229 and the evacuation chamber 246, gaskets (preferably tri-clamp gaskets) 260 are arranged between the connection parts of the hygienic lances 230 and the product stationing surface 229. These gaskets 260 ensure that none of the food-grade product 250 makes its way between the components during the extraction process. Likewise, and as depicted in FIGS. 3-4, the connection parts of the hygienic lances 230 employ beveled seat seals 530, tri-clamp gaskets 532, and the like to keep a smooth outer surface and cover internal features, such as the sq thread of the connection parts and the like. The same processes and components are used with respect to the connection parts connecting the product stationing surface 229 to the evacuation chamber 246 and the like, as depicted in FIG. 3.

The connection parts of the hygienic lances 230 preferably include an upper assembly 534 and a lower assembly 536, each connected to the housings 516 of the hygienic lances 230, as depicted. The housing 516, specifically the upper housing portion 520, preferably includes an extruding sealing surface 548 upon which the upper assembly 534 can rest and connects the hygienic lance 230 to the top side of the product stationing surface 229. The lower assembly 536, which may be part-in-parcel to the lower housing portion 522 in some embodiments or may be connected thereto in others, connects the hygienic lance 230 to the underside of the product stationing surface 229. The hygienic lance's 230 internal extraction tube 518 runs the length of the hygienic lance 230 and fluidly connects the one or more apertures 528 in the penetration end 512 of the housing 516 to the lower extremity of the housing 516 at the extraction end 514, which is itself fluidly connected to the evacuation chamber 246, creating a continuous fluid connection from the tip of the hygienic lance's 230 penetration end 512 to the evacuation chamber 246.

The hygienic lances 230 of the SPR system 210 are preferably substantially cylindrical in shape, although other useable geometries will be known to those of skill in the art. The height of the hygienic lances 230 is preferably between 1 and 3 inches, and more preferably around 2 inches. The diameter of the hygienic lance's 230 housing 516 near the penetration end 512 is preferably less than ½ an inch, and even more preferably around ¼ of an inch. The diameter of the hygienic lance's 230 internal extraction tube 518 is preferably substantially uniform and is preferably less than ⅕ of an inch, and even more preferably around ⅛ of an inch. Those of ordinary skill in the art will recognize that these measurements are not intended to be limiting to the scope of the present invention and may vary depending on the specific application the SPR system 210 is put to use on.

Referring now to FIG. 4 and specifically to the exploded view of the hygienic lance 230 assembly and connection, depicted are the various components and features and the preferable arrangement thereof. The housing 516 containing the internal extraction tube 518, in this embodiment composed of the upper housing portion 520 and the lower housing portion 522 connected using a sanitary weld 524, is inserted from below and through the associated aperture in the product stationing surface 229. The hygienic lances 230 are preferably extendable and retractable such that they are retracted to create a level top side of the product stationing surface 229 when the product packaging is being conveyed to and arranged within the evacuation station 224 and then extended above the top side of the product stationing surface 229 to penetrate the product packaging when the extraction process is initiated, only to be retracted once again when the present case of product packaging is fully evacuated.

The lower housing portion 522 preferably includes a circumferentially extending disk 550 design near the extraction end 514 of the hygienic lance 230, the upper surface 552 of the circumferentially extending disk portion 550 abutting the underside of the product stationing surface 229. Arranged therebetween is a gasket 260, preferably a triclamp gasket 532, as depicted in FIG. 4. A second tri-clamp gasket 532 is preferably arranged between the connection of the upper assembly 534 and the top side of the product stationing surface 229, and finally a third tri-clamp gasket 532 is preferably arranged between the connection of the upper assembly's 534 beveled seat seal 530 and the extruding sealing surface 548 of the upper housing portion 520, as depicted. When fully assembled, each hygienic lance 230 is retractably affixed to the product stationing surface 229 in this manner in preparation for its use in the extraction process, in preferable embodiments.

Referring now to FIG. 5, a particularly preferable embodiment of the present invention is depicted. Specifically depicted are the pre-processing station 314 and accompanying pallet staging area 315, loading station 316, and infeed conveyor 322 for transporting items to the evacuation station 324. The evacuation station 324 is depicted as well and includes an outer housing 612 with access door 614, viewing window 616, and control panel 618. Product 350 is conveyed from the pre-processing station 314 through the ingress opening 620 in the outer housing 612 and into the evacuation station 324, whereupon the product 350 is processed and extracted using the features of the evacuation station 324 discussed above.

The product stationing surface 329, one or more hygienic lances 330, distending compression plate 328, and other features of the evacuation station 324, including the pumping system 380 and evacuation chamber 346, are all preferably contained within the outer housing 612, as depicted in FIG. 5. This arrangement provides for safety of the operators of the system and helps maintain sanitary conditions compliant with 3-A sanitation standards. The components and features of the CIP system 356, in preferable embodiments that include a CIP system 356, are also preferably contained within the outer housing 612, to the extent practicable, as those of skill in the art will understand.

Upon completion of the extraction process, once the recovered product 350 has been removed from the product packaging, product packaging is removed from the evacuation station 324 through the egress opening 622 in the outer housing 612, as depicted in FIG. 5. The emptied product packaging is transported, again preferably via an outflow conveyor 374, to the compacting station 378 or other waste handling location 382. In the preferable embodiment depicted in FIG. 5, the waste products are transported away from the system using a push-cart 624. In some preferable embodiments, waste material is compacted at a compacting station 378 and then transported to such a push-cart 624 for removal. Those of skill in the art will recognize the various compaction features and processes available for use with the present invention.

As depicted in FIG. 5, the present invention preferably includes adjustable feet 626 for supporting the system 310 and ensuring it can be placed on a generally level floor. Each foot 626 is preferably individually adjustable to ensure stability; the feet 626 are also preferably adjustable as a group to change the elevation level of the system 310, making it more user friendly. In some preferable embodiments, the feet 626 comprise lockable wheels 628, which facilitate relocating the system 310 but allow it to be locked into place when ready for processing. In some preferable embodiments, such adjustments may be made manually, while in others they can be automated and controlled by the user operating the control system 370.

While the present invention has been described with reference to particular embodiments and arrangements of parts, features, and the like, it is not limited to these embodiments or arrangements. Indeed, modifications and variations will be ascertainable to those of skill in the art, all of which are inferentially and inherently included in these teachings. It is to be understood, therefore, that the invention may be carried out by different equipment and devices than those described herein, and that various modifications, both as to the equipment details and operating procedures, may be accomplished without departing from the spirit and scope of the present invention.

What is claimed is:

1. An automated, hygienic, food-grade product recovery system comprising:
   an evacuation chamber;
   a substantially flat surface station upon which one or more packages containing a recoverable, food-grade product are placed, the substantially flat surface station comprising one or more surface-station apertures;
   one or more hygienic lances capable of extending through the one or more surface-station apertures and into the one or more packages containing recoverable, food-grade product resting thereon, the one or more hygienic lances each comprising a sharpened penetration end, one or more lance apertures located substantially adjacent to the sharpened penetration end, and an internal extraction tube fluidly connected to both the one or more lance apertures and the evacuation chamber; and
   means for holding the one or more packages containing the recoverable, food-grade product stationary during extraction.

2. The recovery system of claim 1, wherein the system is compliant with hygienic and sanitary standards promulgated by 3-A Sanitary Standards Inc. and adopted by the USDA, the FDA, and state regulatory authorities.

3. The recovery system of claim 1, further comprising a distending compression plate opposite the substantially flat surface station and wherein the means for holding the one or more packages containing the recoverable, food-grade product stationary during extraction comprises the distending compression plate.

4. The recovery system of claim 1, further comprising a pumping system fluidly connected to the internal extraction tube of the one or more hygienic lances.

5. The recovery system of claim 4, wherein the pumping system comprises a liquid ring hygienic 3-A pump and one or more pressure sensors to monitor the discharge pressure in the pumping system.

6. The recovery system of claim 1, further comprising a fluid flow system comprising one or more one-way isolation valves to prevent back flow during extraction, one or more two-way bypass valves to allow recirculation of fluid throughout the recovery system, a sanitary filtration system comprising one or more hygienic angle line 3-A filters, a flow switch to monitor and control the flow of product through the fluid flow system.

7. The recovery system of claim 6, wherein the sanitary filtration system of the fluid flow system further comprises a sanitary air eliminator to prevent the comingling of air with the food-grade product.

8. The recovery system of claim 1, further comprising a holding tank fluidly connected to the evacuation chamber.

9. The recovery system of claim 8, further comprising a pumping system for fluidly connected to the internal extraction tube of the one or more hygienic lances for pumping the recoverable, food-grade product from the one or more packages, through the one or more hygienic lances' one or more apertures and internal extraction tubes, through the evacuation chamber, and into the holding tank.

10. The recovery system of claim 1, further comprising a pre-processing station comprising a loading zone and infeed conveyor, the one or more packages containing recoverable, food-grade product being loaded onto the infeed conveyor and transported thereby to the substantially flat surface station for processing.

11. The recovery system of claim 10, wherein the pre-processing station further comprises one or more sensors and imaging technology for determining the size, orientation, and arrangement of recoverable, food-grade product within each of the one or more packages.

12. The recovery system of claim 1, further comprising a waste removal system comprising an outfeed conveyor, a waste compactor, and a waste removal station.

13. The recovery system of claim 1, further comprising a clean-in-place (CIP) system for sanitizing the recovery system after use, the CIP system comprising a cleaning hood sized and oriented to fit around the substantially flat surface station and the one or more hygienic lances, a gasket to seal the space between the cleaning hood and the substantially flat surface station, an ultraviolet sanitation source within the cleaning hood, and an intake port for introducing cleaning product into the cleaning hood and throughout the CIP system.

14. The recovery system of claim 13, further comprising a control system through which a user can: provide information about the one or more packages containing recoverable, food-grade product, such as their size and orientation; provide information about the food-grade product, such as its viscosity and the size, orientation, and arrangement of any containers within the one or more packages; manage the evacuation process, such as setting an orientation, placement, and depth of penetration of the one or more hygienic lances; and manage the CIP system, such as setting the pressure the cleaning product will be introduced to and circulated throughout the recovery system.

15. The recovery system of claim 1, further comprising a control system through which a user can: provide information about the one or more packages containing recoverable, food-grade product, such as their size and orientation; provide information about the food-grade product, such as its viscosity and the size, orientation, and arrangement of any containers within the one or more packages; and manage the evacuation process, such as setting an orientation, placement, and depth of penetration of the one or more hygienic lances.

16. The recovery system of claim 15, wherein the control system comprises an input device, such as a touchscreen.

17. The recovery system of claim 1, wherein the one or more hygienic lances further comprises an evacuation end located adjacent to the substantially flat surface station during evacuation, the one or more hygienic lances being extendable such that the penetration end extends above a top surface of the substantially flat surface station during evacuation and being retractable such that the penetration end is substantially parallel with or below the top surface of the substantially flat surface station during loading of the one or more packages containing recoverable, food-grade product for processing.

18. The recovery system of claim 17, wherein the one or more hygienic lances further comprises a housing containing the internal extraction tube, the one or more lance apertures fluidly connecting the internal extraction tube to an outer surface of the housing, the sharpened penetration end of the housing comprising a point or blade to facilitate insertion into the one or more packages containing recoverable, food-grade product, the evacuation end being fluidly connected to the evacuation chamber and comprising a circumferentially extruding disk portion that abuts a lower surface of the substantially flat surface station when the one or more hygienic lances is extended above the top surface of the substantially flat surface station for during extraction, and the housing comprising one or more seals and gaskets to ensure the outer surface of the housing remains substantially smooth to facilitate the insertion of the one or more hygienic lances into the one or more packages containing recoverable, food-grade product.

19. An automated, hygienic, food-grade product recovery system comprising:
    an evacuation chamber;
    a substantially flat surface station upon which one or more packages containing a recoverable, food-grade product are placed, the substantially flat surface station comprising one or more surface-station apertures;
    one or more hygienic lances capable of extending through the one or more surface-station apertures and into the one or more packages containing recoverable, food-grade product resting thereon, the one or more hygienic lances each comprising a sharpened penetration end, one or more lance apertures located substantially adjacent to the sharpened penetration end, and an internal extraction tube fluidly connected to both the one or more lance apertures and the evacuation chamber;
    a distending compression plate opposite the substantially flat surface station for holding in place and introducing pressure to the one or more packages containing the recoverable, food-grade product;
    a pumping system fluidly connected to the internal extraction tube of the one or more hygienic lances for pumping the recoverable, food-grade product from the one or more packages; and
    an infeed conveyor for transporting the one or more packages containing a recoverable, food-grade product onto the substantially flat surface station and an outfeed conveyor for transporting the one or more packages once the extraction process is complete.

20. The recovery system of claim 19, further comprising a control system through which a user can: provide information about the one or more packages containing recoverable, food-grade product, such as their size and orientation; provide information about the food-grade product, such as its viscosity and the size, orientation, and arrangement of any containers within the one or more packages; and manage the evacuation process, such as setting an orientation, placement, and depth of penetration of the one or more hygienic lances.

\* \* \* \* \*